United States Patent
Yu

(10) Patent No.: US 8,130,091 B2
(45) Date of Patent: Mar. 6, 2012

(54) CARRIER WAVE DETECTING TIRE PRESSURE DETECTING APPARATUS AND OPERATING METHOD FOR THE SAME

(75) Inventor: Hung-Chih Yu, Taichung (TW)

(73) Assignee: Orange Electronic Co., Ltd., Taichung Hsien (TW)

(*) Notice: Subject to any disclaimer, the term of this patent is extended or adjusted under 35 U.S.C. 154(b) by 316 days.

(21) Appl. No.: 12/426,998

(22) Filed: Apr. 21, 2009

(65) Prior Publication Data

US 2010/0265054 A1  Oct. 21, 2010

(51) Int. Cl.
B60C 23/00  (2006.01)

(52) U.S. Cl. ......... 340/447; 340/442; 340/443; 340/444; 340/445; 340/448; 73/146.2; 73/146.3; 73/146.4; 73/146.8; 116/34 R; 116/34 A; 116/34 B; 343/711; 343/717; 152/151; 152/152.1

(58) Field of Classification Search .......... 340/442–448; 73/146.2–146.8; 116/34 R, 34 A, 34 B; 343/711, 343/717; 152/151, 152.1

See application file for complete search history.

(56) References Cited

U.S. PATENT DOCUMENTS

| 2004/0155764 A1* | 8/2004 | Ichinose | 340/447 |
| 2009/0091427 A1* | 4/2009 | Shiotsu et al. | 340/10.1 |
| 2009/0224899 A1* | 9/2009 | Wieser | 340/444 |

* cited by examiner

Primary Examiner — George Bugg
Assistant Examiner — Ojiako Nwugo
(74) Attorney, Agent, or Firm — Alan Kamrath; Kamrath IP Lawfirm, PA

(57) ABSTRACT

A tire pressure detecting apparatus has a micro-controller, a detecting module and a transceiver. The detecting module is electronically connected to the micro-controller and has a tire pressure detecting unit controlled by the micro-controller to detect a tire pressure inside a tire. The transceiver is electronically connected to the micro-controller, transmits a high frequency signal corresponding to detected characteristic tire parameters from the detecting module to a monitoring system inside a car and receives an external high frequency signal sent from external tire pressure detecting apparatus for the micro-controller, with the micro-controller temporarily delaying sending of the high frequency signal until a waiting time has expired to prevent signal collision between the high frequency signal and the external high frequency signal.

11 Claims, 4 Drawing Sheets

CARRIER WAVE DETECTING TIRE PRESSURE DETECTING APPARATUS AND OPERATING METHOD FOR THE SAME

BACKGROUND OF THE INVENTION

1. Field of Invention

The present invention relates to a tire pressure detecting apparatus, and more particularly to a tire pressure detecting apparatus that is capable of detecting carrier waves.

2. Description of the Related Art

With reference to FIG. 5, a tire pressure monitoring system (TPMSs) comprises multiple tire pressure detectors (51) and a monitoring apparatus (53). The tire pressure detectors (51) have non-identical ID numbers therein and are installed respectively inside tires (52) of a vehicle (50) to continuously detect tire pressure inside the tires (52). The monitoring apparatus (53) is normally installed inside the vehicle (50), receives a wireless signal corresponding to the detected tire pressure inside the tire (52) from the tire pressure detector (51), and displays the detected results for driver observation.

Each tire pressure detector (51) and the monitoring apparatus (53) communicate by one-way transmissions. The tire pressure detectors (51) may send wireless signals to the monitoring apparatus (53) at the same time so that the monitoring apparatus (53) gathers incorrect messages due to interference between the wireless signals.

To overcome the interference problem, a tire pressure detector may send the same data to the monitoring apparatus (53) eight times interspaced by an interval. Despite resolving interference problems, power loading of the tire pressure detector is increased, thereby reducing lifetime and reducing intervals between servicing or increasing costs due to larger battery installation.

The present invention provides a tire pressure detecting apparatus to obviate or mitigate the shortcoming of the conventional tire pressure detector.

SUMMARY OF THE INVENTION

The primary objective of the present invention is to provide a tire pressure detecting apparatus that is capable of detecting carrier waves to prevent collision of signals sent from different tire pressure detecting apparatuses.

The tire pressure detecting apparatus has a micro-controller, a detecting module and a transceiver. The detecting module is electronically connected to the micro-controller and has a tire pressure detecting unit controlled by the micro-controller to detect a tire pressure inside a tire. The transceiver is electronically connected to the micro-controller, transmits a high frequency signal corresponding to detected characteristic tire parameters from the detecting module to a monitoring system inside a car, and receives an external high frequency signal sent from an external tire pressure detecting apparatus for the micro-controller, with the micro-controller temporarily delaying sending of the high frequency signal until a waiting time has expired to prevent signal collision between the high frequency signal and the external high frequency signal.

Other objectives, advantages and novel features of the invention will become more apparent from the following detailed description when taken in conjunction with the accompanying drawings.

DETAILED DESCRIPTION OF THE INVENTION

Figure 1:
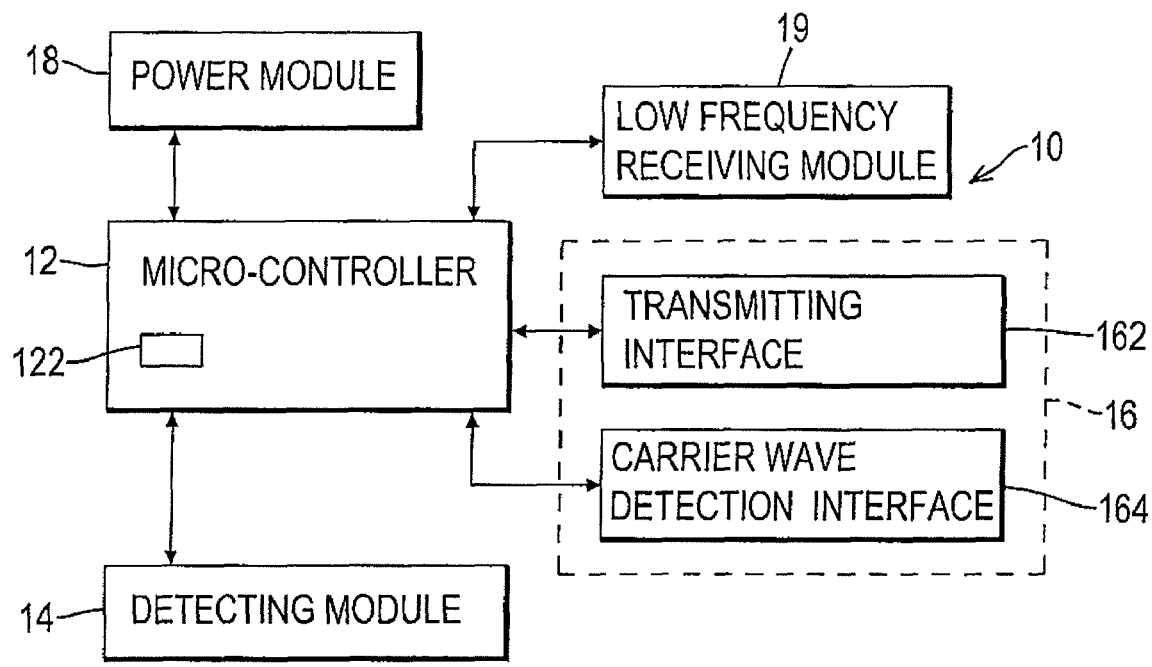
FIG. 1 is a block diagram of a first embodiment of a tire pressure detecting apparatus in accordance with the present invention.
Figure 2:
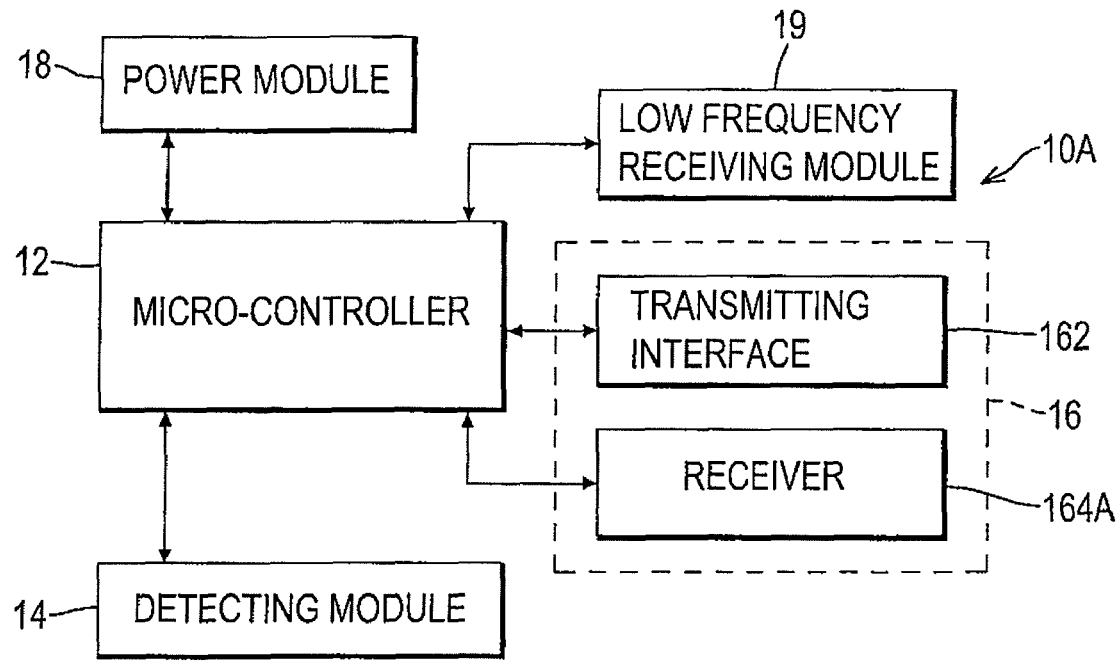
FIG. 2 is a block diagram of a second embodiment of the tire pressure detecting apparatus in accordance with the present invention.
Figure 3:
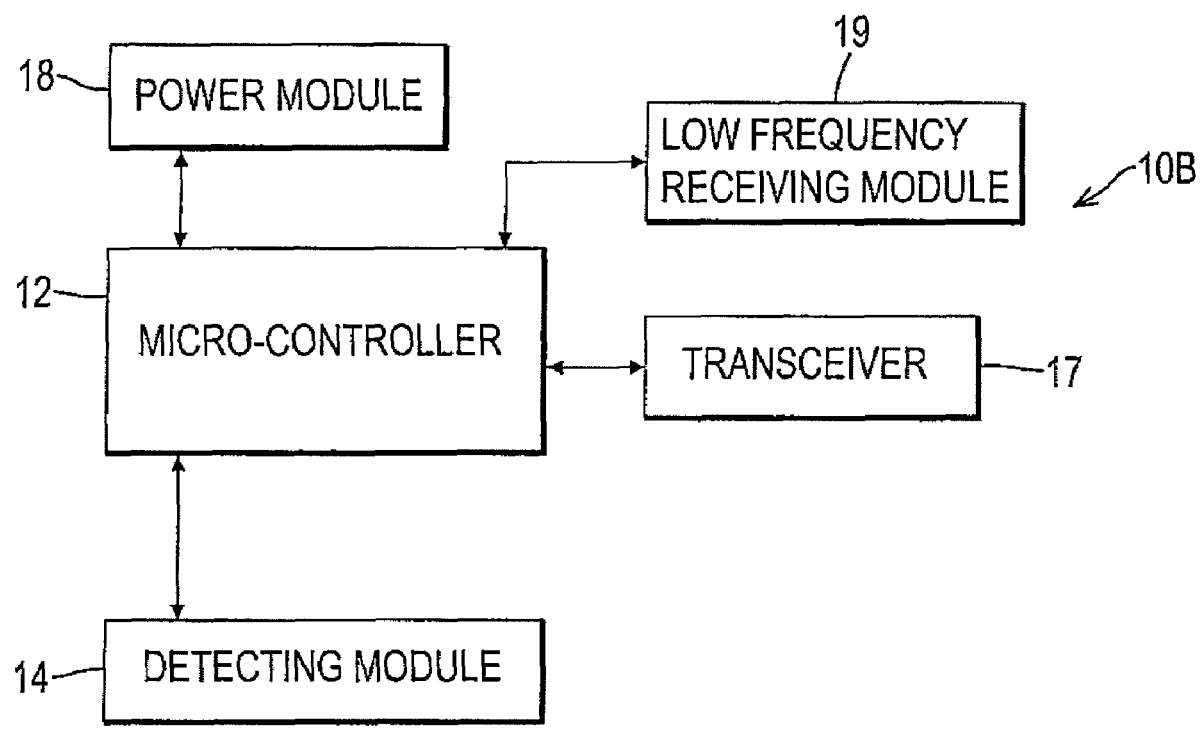
FIG. 3 is a block diagram of a third embodiment of the tire pressure detecting apparatus in accordance with the present invention.

With reference to FIGS. 1, 2 and 3, a tire pressure detecting apparatus (10, 10A, 10B) in accordance with the present invention is mounted in a tire and has a micro-controller (12), a detecting module (14), a power module (18), an optional low frequency receiving module (19) and a transceiver (16, 17).

The micro-controller (12) may have a memory (122) having an identification (ID) number and a program. The program may perform a carrier wave detecting and signal sending method.

The detecting module (14) is electronically connected to and controlled by the micro-controller (12) to detect at least one characteristic tire parameter, such as but not limited to pressure, temperature and acceleration. The detecting module (14) may have a tire pressure detecting unit, a temperature detecting unit and at least one acceleration-detecting unit. Two acceleration-detecting units may be installed at a relative angle to each other, and, preferably, the acceleration-detecting units are installed perpendicular to each other, allowing two accelerations in two directions to be detected so that a direction change of the car is detectable.

The power module (18) may be a battery or a power generator, is electronically connected to the micro-controller (12) and provides electric power to the tire pressure detecting apparatus (10, 10A, 10B). The said power generator may have a magnetic coil connected to the micro-controller (12) and induced to generate current by a moving magnet. The moving magnet is installed adjacent to the magnetic coil and is continuously moved while the car is running.

The low frequency receiving module (19) is electronically connected to the micro-controller (12) and is a low frequency wireless signal receiver capable of receiving low frequency (kilo-Hertz) wireless signals, preferably around 125 kHz. The low frequency receiving module (19) has a lower transparency so only receives signals sent from a source close to the low frequency receiving module (19). Hence, the low frequency wireless signal can be adjusted to receive only from one particular source by adjusting the distance from the particular source.

The low frequency wireless signal may comprise a writing command and a new ID number, so that the memory (122) is rewritten with the new ID number. The new ID number may belong to a failed tire pressure detecting apparatus (10, 10A, 10B) that needs to be replaced. Therefore, the tire pressure detecting apparatus (10, 10A, 10B) can be updated using the new ID allowing simple replacement, thereby preventing necessity for complicated installation procedures such as rebooting and resetting a monitoring system. To reboot or reset the monitoring system, the monitoring system is forced to scan and memorize a last installed tire pressure detecting apparatus (10, 10A, 10B) that has a whole new ID number, so that the monitoring system is capable of receiving signals from the last installed tire pressure detecting apparatus (10, 10A, 10B).

The transceiver (16, 17) is electronically connected to the micro-controller (12), transmits a high frequency signal corresponding to detected tire parameters from the detecting module (14) to the monitoring system and simultaneously detects external high frequency signals sent from other tire pressure detecting apparatuses (10, 10A, 10B), thereby determining a transmission window and transmitting during the transmission window. The transmission window is detected when no other high frequency signals are received by the transceiver (16, 17). The frequency of the high frequency signal is relatively higher than the signals detected by the low frequency receiving module (19) and may be UHF such as 315 MHZ, 433 MHz, 455 MHZ. If an external high frequency signal is detected, the micro-controller (12) temporarily postpones the transceiver (16, 17) from sending the high frequency signal until a waiting time has expired to prevent signal collision.

The transceiver (16, 17) may be an integrally designed transceiving module (17) with an antenna or may have a transmitting interface (162) and a detecting interface.

The transceiving module (17) transmits the high frequency signal and receives external high frequency signal via the antenna.

The transmitting interface (162) is electronically connected to and controlled by the micro-controller (12) to transmit the high frequency signal.

The detecting interface is electronically connected to the micro-controller (12), detects the external high frequency signals and may be a carrier wave detection interface (164) or a receiver (164A). The detecting interface (164) may be an induction coil or a micro-coil allowing the external high frequency signals or a carrier wave of the external high frequency signals nearby to induce a current in the micro-controller (12).

The receiver (164A) is a circuit with an antenna capable of receiving or detecting the external high frequency signals.

In us, multiple tire pressure detecting apparatuses (10, 10A, 10B) are respectively installed inside tires of a vehicle. Each tire pressure detecting apparatus (10, 10A, 10B) continuously detects characteristic tire parameters such as tire pressure, temperature and acceleration and simultaneously checks whether the other tire pressure detecting apparatuses (10, 10A, 10B) are sending high frequency signals. The tire pressure detecting apparatus (10, 10A, 10B) postpones the sending procedure until no other tire pressure detecting apparatus (10, 10A, 10B) is sending. Hence, collision problems are solved, since only one tire pressure detecting apparatus (10, 10A, 10B) can send the high frequency signal at one time. Moreover, a lifetime of the tire pressure detecting apparatus (10, 10A, 10B) is extended, since the tire pressure detecting apparatus (10, 10A, 10B) saves power by not sending excess signals.

Figure 4:
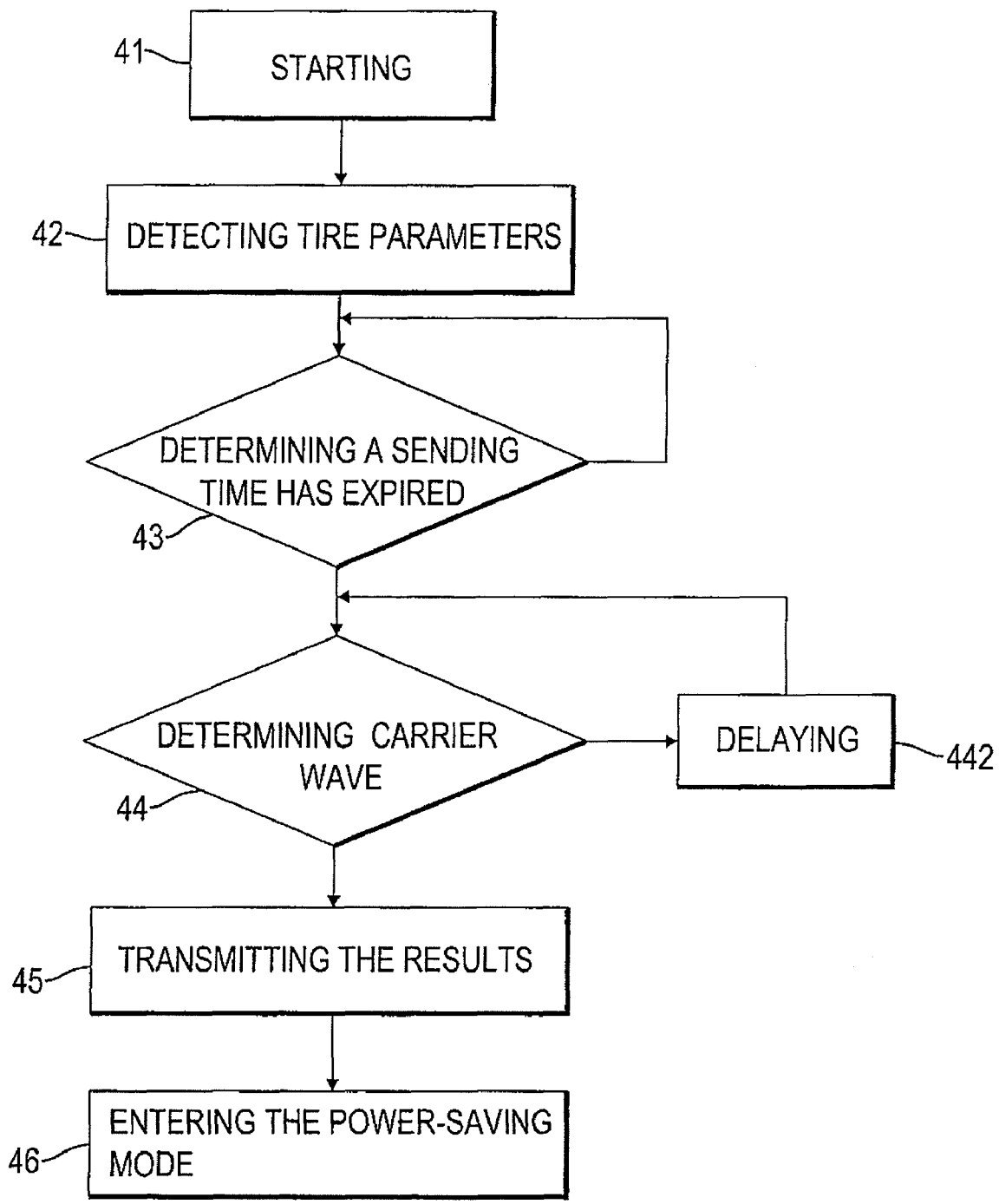
FIG. 4 is a flow chart of a carrier wave detecting and signal sending method in accordance with the present invention.
Figure 5:
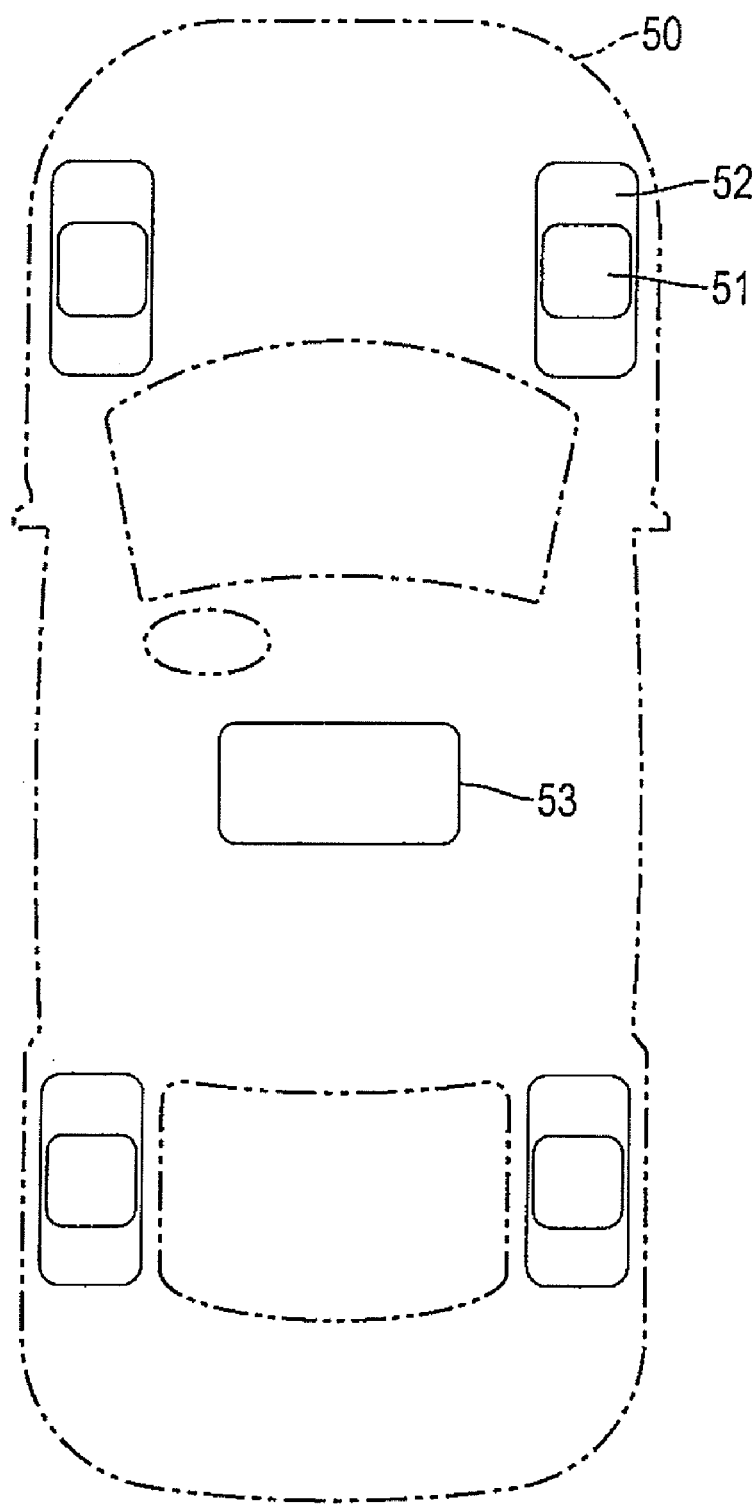
FIG. 5 is schematic diagram representing a conventional tire pressure detecting system in accordance with the prior art mounted in a car.

With reference to FIG. 4, the carrier wave detecting and signal sending method performed by the micro-controller (12) in accordance with the present invention comprises the steps of: starting (41), detecting tire parameters (42), determining a sending time has expired (43), detecting a carrier wave (44), delaying (442), transmitting the results (45) and entering the power-saving mode (46).

In the step of starting (41), the micro-controller (12) is actuated from a power-saving mode to detect characteristic tire parameters and to receive and detect wireless signals. The power-saving mode requires little power in which wireless signals are not sent, detected and received. The micro-controller (12) may be actuated by a count down interval or an information request signal.

In the step of detecting tire parameters (42), the detecting module (14) is controlled by the micro-controller (12) to detect characteristic tire parameters, such as tire pressure, temperature and acceleration.

In the step of determining a sending time has expired (43), the micro-controller (12) continuously checks if a sending time has expired and may be initially defined in the micro-controller (12). The sending time may be an interval that is started to count down at the beginning of this step (43). For instance, the sending time may be initially defined as 120 seconds and may start to count down after the characteristic tire parameters are detected, and the micro-controller (12) checks whether the sending time equals to zero during the step (43).

In the step of detecting carrier wave (44), the micro-controller (12) checks whether a carrier wave is detected by the transceiver (16, 17). When detected, the step of delaying (442) is implemented. Otherwise, the step of transmitting the results (45) is implemented.

In the step of delaying (442), the micro-controller (12) delays transmission and counts down a waiting time.

In the step of transmitting the results (45), the detected characteristic tire parameters are continuously transmitted as high frequency signals.

In the step of entering the power-saving mode (46), the tire pressure detecting apparatus (10, 10A, 10B) returns to the power-saving mode.

As described above, signal collision problems associated with the prior art is solved, since only one tire pressure detecting apparatus (10, 10A, 10B) can transmit the high frequency signal to the monitoring system. Another benefit is that a lifetime of the tire pressure detecting apparatus (10, 10A, 10B) in accordance with the present invention is extended, since no excess high frequency signals are sent.

Even though numerous characteristics and advantages of the present invention have been set forth in the foregoing description, together with details of the structure and function of the invention, the disclosure is illustrative only. Changes may be made in detail, especially in matters of shape, size and arrangement of parts, within the principles of the invention to the full extent indicated by the broad general meaning of the terms in which the appended claims are expressed.

What is claimed is:

1. A tire pressure detecting apparatus mounted in a tire and comprising:
   a micro-controller;
   a detecting module electronically connected to and controlled by the micro-controller to detect characteristic tire parameters inside the tire, with the tire characteristic parameter comprising a tire pressure;
   a power module electronically connected to the micro-controller and providing electric power to the tire pressure detecting apparatus; and
   a transceiver electronically connected to the micro-controller and detecting if an external high frequency signal exists, wherein the micro-controller temporarily postpones the transceiver sending a high frequency signal corresponding to the detected characteristic tire parameters until a wait time expires if the external high frequency signal is detected, with the transceiver transmitting the high frequency signal to a monitoring system if the external high frequency is not detected and receiving an external high frequency signal from an external tire pressure detecting apparatus.

2. The tire pressure detecting apparatus as claimed in claim 1, wherein
   the micro-controller further has a memory comprising an identification (ID) number; and
   the tire pressure detecting apparatus further has a low frequency receiving module electronically connected to the micro-controller and receiving a low frequency wireless signal comprising a writing command and a new ID number for the micro-controller to overwrite the ID number with the new ID number.

3. The tire pressure detecting apparatus as claimed in claim 2, wherein the transceiver is an integrally designed transceiving module with an antenna and transmits and receives the high frequency signal via the antenna.

4. The tire pressure detecting apparatus as claimed in claim 2, wherein the transceiver has
   a transmitting interface electronically connected to the micro-controller and controlled by the micro-controller to transmit the high frequency signal; and
   a detecting interface electronically connected to the micro-controller and detecting the external high frequency signal for the micro-controller.

5. The tire pressure detecting apparatus as claimed in claim 4, wherein the detecting interface is a coil inducting the external high frequency signals or carrier waves of the external high frequency signal.

6. The tire pressure detecting apparatus as claimed in claim 4, wherein the detecting interface is a receiver receiving the external high frequency signals.

7. The tire pressure detecting apparatus as claimed in claim 4, wherein the detecting module has
   at least one acceleration detecting unit controlled by the micro-controller to detect acceleration of the tire; and
   a temperature detecting unit controlled by the micro-controller to detect an interior temperature of the tire.

8. The carrier wave detecting and signal sending method as claimed in claim 4 further comprising determining a sending time being expired after detecting the characteristic tire parameters, wherein the tire pressure detecting apparatus continuously checks if the sending time has expired, wherein the sending time is initially defined in the tire pressure detecting apparatus and is counted down at a beginning of determining the sending time being expired.

9. The tire pressure detecting apparatus as claimed in claim 1, wherein the transceiver is an integrally designed transceiving module with an antenna and transmits and receives the high frequency signal via the antenna.

10. The tire pressure detecting apparatus as claimed in claim 1, wherein the transceiver has
    a transmitting interface electronically connected to the micro-controller and controlled by the micro-controller to transmit the high frequency signal; and
    a detecting interface electronically connected to the micro-controller and detecting the external high frequency signal for the micro-controller.

11. A carrier wave detecting and signal sending method performed by a tire pressure detecting apparatus comprising:
    starting, with the tire pressure detecting apparatus actuated from a power-saving mode;
    detecting characteristic tire parameters;
    detecting a carrier wave, wherein when the carrier wave is detected, delaying is implemented, and if the carrier wave is not detected, transmitting a high frequency signal corresponding to the characteristic tire parameters detected; and
    entering the power-saving mode.

* * * * *